United States Patent
Xie et al.

(10) Patent No.: US 10,929,558 B2
(45) Date of Patent: Feb. 23, 2021

(54) DATA SECRUITY ENHANCEMENT BY MODEL TRAINING

(71) Applicant: Advanced New Technologies Co., Ltd., Grand Cayman (KY)

(72) Inventors: Ling Xie, Hangzhou (CN); Xiaolong Li, Seattle, WA (US)

(73) Assignee: Advanced New Technologies Co., Ltd., Grand Cayman (KY)

( * ) Notice: Subject to any disclaimer, the term of this patent is extended or adjusted under 35 U.S.C. 154(b) by 195 days.

(21) Appl. No.: 16/047,399

(22) Filed: Jul. 27, 2018

(65) Prior Publication Data
US 2019/0034658 A1 Jan. 31, 2019

(30) Foreign Application Priority Data
Jul. 28, 2017 (CN) .......................... 201710629480.1

(51) Int. Cl.
*G06F 21/62* (2013.01)
*H04L 29/06* (2006.01)
(Continued)

(52) U.S. Cl.
CPC .......... *G06F 21/6245* (2013.01); *G06F 21/57* (2013.01); *G06F 21/606* (2013.01);
(Continued)

(58) Field of Classification Search
CPC ...... G06F 21/6245; G06F 30/20; G06F 21/57; G06F 21/606; G06F 2221/2149;
(Continued)

(56) References Cited

U.S. PATENT DOCUMENTS 8,346,929 B1   1/2013 Lai
8,843,427 B1*  9/2014 Lin ........................ G06N 20/00
                                                706/45
(Continued)

FOREIGN PATENT DOCUMENTS

CN   102156641   8/2011
CN   102681992   9/2012
(Continued)

OTHER PUBLICATIONS

International Search Report and Written Opinion in International Application No. PCT/US2018/044282, dated Nov. 6, 2018, 13 pages.
(Continued)

*Primary Examiner* — Yonas A Bayou
(74) *Attorney, Agent, or Firm* — Fish & Richardson P.C.

(57) ABSTRACT

Encrypted user data are received at a service device from at least one user equipment, and the user data is encrypted in a trusted zone of the at least one user equipment. The encrypted user data then be decrypted in a trust zone of the service device by a first central processing unit (CPU) to obtain decrypted user data. A model is trained by using the decrypted user data to determine a training intermediate value and a training effective representative value, and a determination is made whether the training effective representative value satisfies a specified condition is determined. If so, the trained model is generated based on a model parameter. Otherwise, a model parameter is iterately adjusted and the model is iteratively trained based on an adjusted model parameter until the trained effective representative value satisfies the specified condition.

15 Claims, 12 Drawing Sheets

(51) Int. Cl.
*G06F 21/60* (2013.01)
*H04W 12/02* (2009.01)
*G06F 21/57* (2013.01)
*G06F 30/20* (2020.01)
*G06N 20/00* (2019.01)

(52) U.S. Cl.
CPC .............. *G06F 30/20* (2020.01); *G06N 20/00* (2019.01); *H04L 63/0428* (2013.01); *H04W 12/02* (2013.01); *G06F 2221/2149* (2013.01); *H04L 2209/80* (2013.01)

(58) Field of Classification Search
CPC . G06N 20/00; H04L 63/0428; H04L 2209/80; H04W 12/02
See application file for complete search history.

(56) References Cited

U.S. PATENT DOCUMENTS

| | | | |
|---|---|---|---|
| 2002/0031230 A1 | 3/2002 | Sweet et al. | |
| 2003/0154044 A1 | 8/2003 | Lundstedt et al. | |
| 2003/0212851 A1* | 11/2003 | Drescher | G06K 9/6296 711/100 |
| 2005/0234753 A1* | 10/2005 | Pinto | G06Q 30/02 700/44 |
| 2006/0069717 A1 | 3/2006 | Mamou et al. | |
| 2007/0118880 A1* | 5/2007 | Mauro, II | G06F 21/79 726/4 |
| 2007/0288413 A1* | 12/2007 | Mizuno | G06N 7/005 706/46 |
| 2009/0106178 A1* | 4/2009 | Chu | G06N 20/00 706/14 |
| 2009/0165013 A1* | 6/2009 | Sugaya | G06F 9/4418 718/105 |
| 2012/0016816 A1* | 1/2012 | Yanase | G06N 20/00 706/10 |
| 2016/0078361 A1 | 3/2016 | Brueckner et al. | |
| 2016/0149912 A1 | 5/2016 | Scott-Nash et al. | |
| 2016/0180078 A1* | 6/2016 | Chhabra | H04W 12/06 726/19 |
| 2016/0321543 A1* | 11/2016 | Chen | G06Q 20/4016 |

FOREIGN PATENT DOCUMENTS

| | | |
|---|---|---|
| CN | 105512576 | 4/2016 |
| WO | WO 2010105249 | 9/2010 |
| WO | WO 2016090606 | 6/2016 |

OTHER PUBLICATIONS sohu.com [online], "Where are Spark and Mesos Born? What New Technologies are They Studying'?", Feb. 2017, retrieved on Feb. 28, 2020, retrieved from URL <https://www.sohu.com/a/125781607_332175>, 19 pages (with English translation).

Crosby et al., "BlockChain Technology: Beyond Bitcoin," Sutardja Center for Entrepreneurship & Technology Technica Report, Oct. 16, 2015, 35 pages.

Nakamoto, "Bitcoin: A Peer-to-Peer Electronic Cash System," www.bitcoin.org, 2005, 9 pages.

PCT International Search Report on Patentability in International Appln. No. PCT/US2018-044282, dated Nov. 22, 2019, 16 pages.

* cited by examiner

DATA SECRUITY ENHANCEMENT BY MODEL TRAINING

CROSS-REFERENCE TO RELATED APPLICATIONS

This application claims priority to Chinese Patent Application No. 201710629480.1, filed on Jul. 28, 2017, which is hereby incorporated by reference in its entirety.

TECHNICAL FIELD

The present disclosure relates to the field of information technologies, and in particular, to a model training method and apparatus.

BACKGROUND

Currently, it has become an increasingly mature mode for a service provider to use a self-trained model to provide services such as prediction, risk management, and early warning for users such as enterprises or individuals. In this mode, the quality of service provided by the service provider depends largely on accuracy of the trained model.

It is well known that the more abundant and diversified the samples used to train a model, the more accurate the trained model can be obtained. However, sometimes there are data privacy problems when acquiring data.

Based on the existing technology, a model training method that can improve accuracy of a model of a service provider and protect user privacy from leaking is needed.

SUMMARY

Implementations of the present disclosure provide a model training method and apparatus, to improve accuracy of a model of a service provider without leaking user privacy.

To resolve the previous technical problem, the implementations of the present disclosure are implemented as described below.

An implementation of the present disclosure provides a model training method, where a service device has a trusted zone, and the method includes: receiving, by the service device, encrypted data sent by user equipment; decrypting the encrypted data in the trusted zone to obtain user data; and training a model by using the user data in the trusted zone.

An implementation of the present disclosure provides a model training method, where a service device has a trusted zone, and the method includes: encrypting, by user equipment, user data to obtain encrypted data; and sending the encrypted data to the service device, so that the service device decrypts the encrypted data in the trusted zone to obtain the user data, and trains a model by using the user data.

An implementation of the present disclosure provides a model training apparatus, where the apparatus has a trusted zone, and the apparatus includes: a receiving module, configured to receive encrypted data sent by user equipment; a decryption module, configured to decrypt the encrypted data in the trusted zone to obtain user data; and a training module, configured to train a model by using the user data in the trusted zone.

An implementation of the present disclosure provides a model training apparatus, where a service device has a trusted zone, and the apparatus includes: an encryption module, configured to encrypt user data to obtain encrypted data; and a sending module, configured to send the encrypted data to the service device, so that the service device decrypts the encrypted data in the trusted zone to obtain the user data, and trains a model by using the user data.

An implementation of the present disclosure provides a service device, where the service device has a trusted zone, the service device includes one or more processors and a memory, the memory stores a program, and the program is executed by the one or more processors to perform the following steps: receiving encrypted data sent by user equipment; decrypting the encrypted data in the trusted zone to obtain user data; and training a model by using the user data in the trusted zone.

An implementation of the present disclosure provides user equipment, where a service device has a trusted zone, the user equipment includes one or more processors and a memory, the memory stores a program, and the program is executed by the one or more processors to perform the following steps: encrypting user data to obtain encrypted data; and sending the encrypted data to the service device, so that the service device decrypts the encrypted data in the trusted zone to obtain the user data, and trains a model by using the user data.

It can be seen from the previous technical solutions provided in the implementations of the present disclosure that the encrypted data is decrypted in the trusted zone of the service device to obtain the user data, and the model is trained by using the user data in the trusted zone disclosure. As such, the model is trained by using more comprehensive user data including user privacy, so that the obtained model is more accurate. In addition, the user data is only exposed in the trusted zone. Even the owner of the service device cannot obtain the user data in the trusted zone, and the user privacy will not be leaked.

BRIEF DESCRIPTION OF DRAWINGS

To describe technical solutions in the implementations of the present disclosure or in the existing technology more clearly, the following briefly describes the accompanying drawings required for describing the implementations or the existing technology. Apparently, the accompanying drawings in the following description merely show some implementations of the present disclosure, and a person of ordinary skill in the art can still derive other drawings from these accompanying drawings without creative efforts.

DESCRIPTION OF IMPLEMENTATIONS

Figure 1:
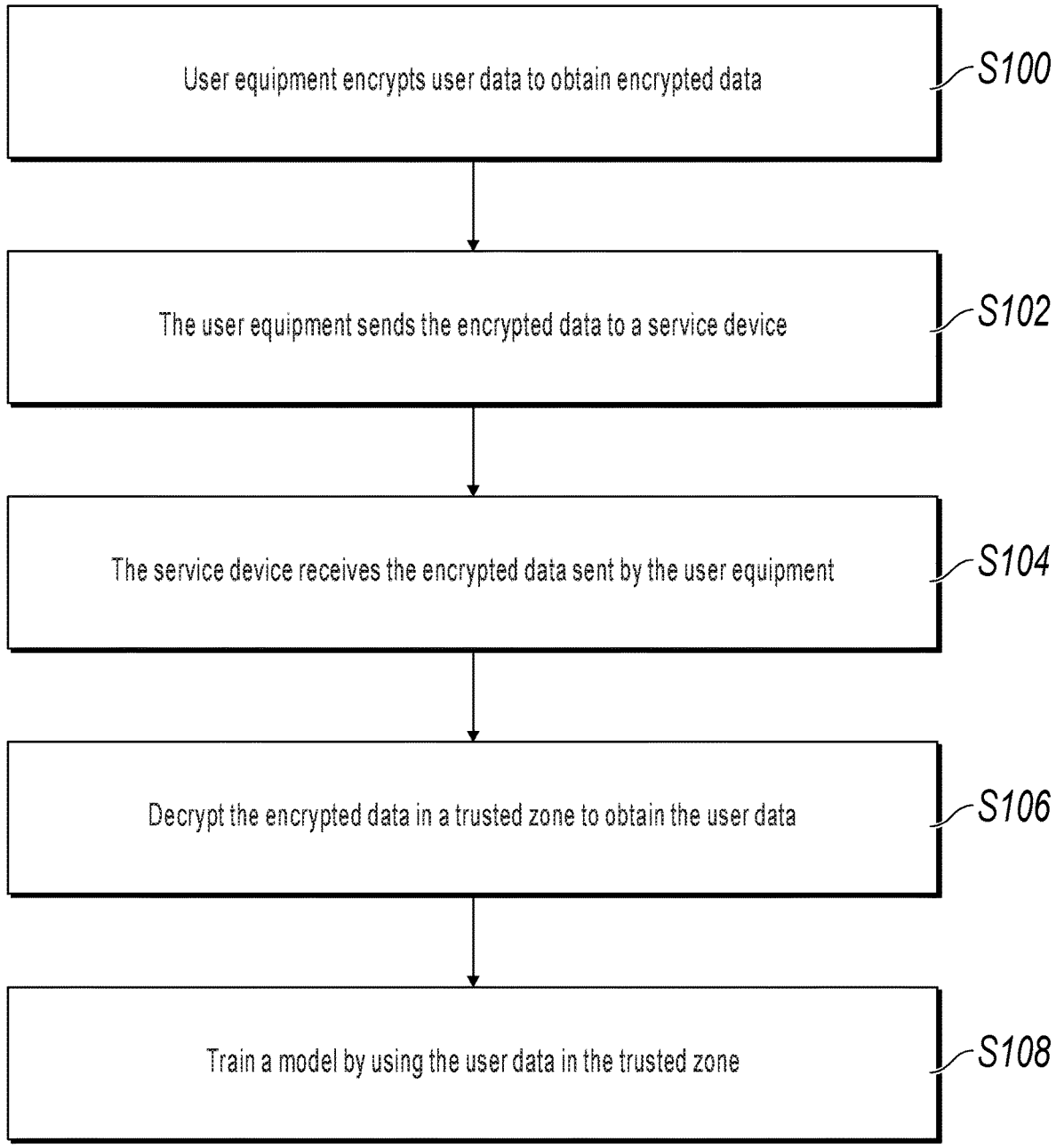
FIG. 1 is a flowchart illustrating a model training method, according to an implementation of the present disclosure.

As described in the background, in the existing technology, a service provider usually directly uses data provided by a user as a sample to train a model. Apparently, the user usually does not provide the service provider with data related to user privacy. Therefore, data samples for model training are insufficient, and the trained model obtained by the service provider is inaccurate.

For example, assuming that a service provider is responsible for training a model that is used to predict profits or losses of an enterprise. If an enterprise wants to predict its future profits or losses, the enterprise usually only provides the service provider with sales data as a model training sample. However, to improve accuracy of the model, the service provider usually also asks the enterprise to provide a financial statement (the financial statement can accurately show profits or losses of the enterprise), to obtain more comprehensive user data as a sample. Apparently, the financial statement is private data for many enterprises.

It can be seen that, in the previous service mode, how to improve accuracy of a model of a service provider while protecting the user's privacy data from leaking is a problem that needs to be solved urgently.

The core idea of the present disclosure is to use a trusted zone in a service device as an execution environment isolated from the outside; decrypt encrypted data in the trusted zone to obtain user data; and train a model by using the user data in the trusted zone, so that the user data is not leaked from the trusted zone in the whole model training process, thereby protecting user privacy. The trusted zone can be located in a central processing unit (CPU) in the service device, or can be located in other components of the service device, for example, a graphics processing unit (GPU) and a memory. For ease of description, in one or more implementations of the present disclosure, descriptions are provided by using an example that the trusted zone in the service device is located in the CPU of the service device. However, a person skilled in the art should understand that this does not limit a technical solution required for protection in the present disclosure.

To make a person skilled in the art better understand the technical solutions in the present disclosure, the following clearly and comprehensively describes the technical solutions in the implementations of the present disclosure with reference to the accompanying drawings in one or more implementations of the present disclosure. Apparently, the described implementations are merely some rather than all of the implementations of the present disclosure. All other implementations obtained by a person of ordinary skill in the art based on the implementations of the present disclosure without creative efforts shall fall within the protection scope of the present disclosure.

The technical solutions provided in the implementations of the present disclosure are described in detail below with reference to the accompanying drawings.

FIG. 1 is a flowchart illustrating a model training method, according to an implementation of the present disclosure. The following steps are included:

S100. User equipment encrypts user data to obtain encrypted data.

S102. The user equipment sends the encrypted data to a service device.

In this implementation of the present disclosure, the user equipment is a device storing the user data for model training. The user data is often private data. For example, if an enterprise needs to predict its future profits or losses, the enterprise needs a service to provide a model for predicting profits or losses of an enterprise. A server of the enterprise can be user equipment. The user equipment stores the user data, and the user data is usually related to user privacy.

The service device is a device of a service provider. It is the owner of the model, and is also the one who needs to train the model. When training the model, the service device needs to use the user data provided by the user equipment, to ensure the calculated results by the trained model are as close as possible to the actual ones.

In this implementation of the present disclosure, to protect the user privacy, the user equipment can encrypt the user data, and encrypted user data is the encrypted data. Then, the user equipment can send the encrypted data to the service device for model training.

S104. The service device receives the encrypted data sent by the user equipment.

S106. Decrypt the encrypted data in a trusted zone to obtain the user data.

S108. Train a model by using the user data in the trusted zone.

Figure 2:
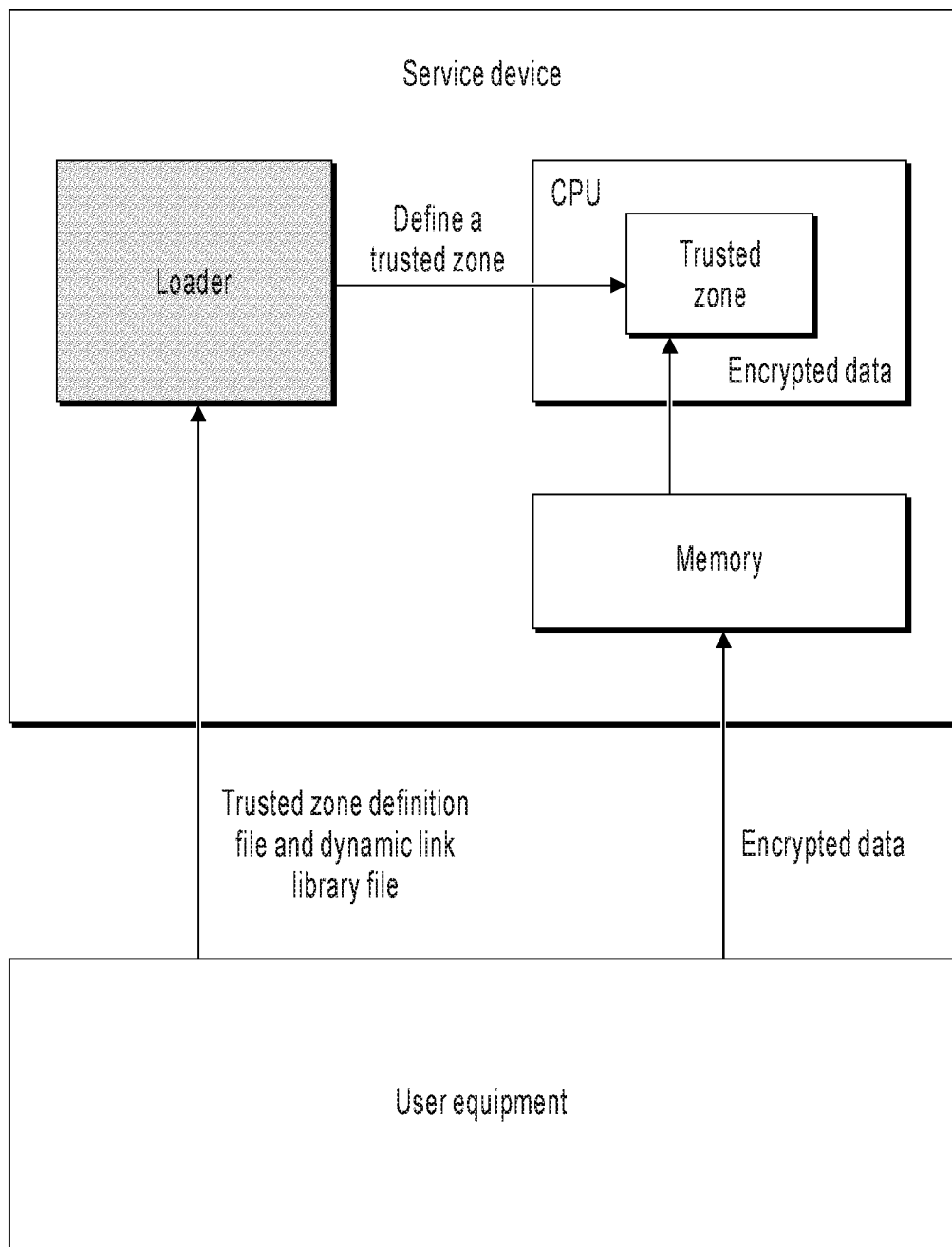
FIG. 2 is an architectural diagram illustrating a training system, according to an implementation of the present disclosure.

FIG. 2 is an architectural diagram illustrating a training system, according to an implementation of the present disclosure. As shown in the architecture in FIG. 2, a service device uses encrypted data from at least one user equipment to train a model. A CPU of the service device has a trusted zone. The trusted zone can be an area physically isolated from a storage area of the CPU. Only specified operations can be performed in the trusted zone. For example, the Intel Software Guard Extensions developed by Intel is generally referred to as "SGX" for short. If the SGX technology is used, as shown in FIG. 2, when sending the encrypted data to the service device, the user equipment can also send a trusted zone definition file (.edl file) and a dynamic link library file (.dll file or .so file) to the service device. A loader in the service device defines the trusted zone in the CPU based on the received definition file, and performs specified operations in the defined trusted zone based on the received dynamic link library file. Certainly, other similar trusted zone technologies can also be applied to this solution, and details are not described here.

In this implementation of the present disclosure, the previously specified operations include a decryption operation for decrypting encrypted data and some (or all) training operations (for example, determining a training intermediate value based on user data and an initialized model parameter, and adjusting a model parameter). To ensure that the user data is not leaked, some training operations performed in the trusted zone can be training operations that need to be performed based on the user data, and other training operations that do not need to be performed based on the user data can be performed outside the trusted zone. Any operation other than the specified operations, for example, extracting the user data from the trusted zone, cannot be performed in the trusted zone. With the trusted zone technology, model training can be performed by using comprehensive user data as a sample without leaking the user data.

Figure 3:
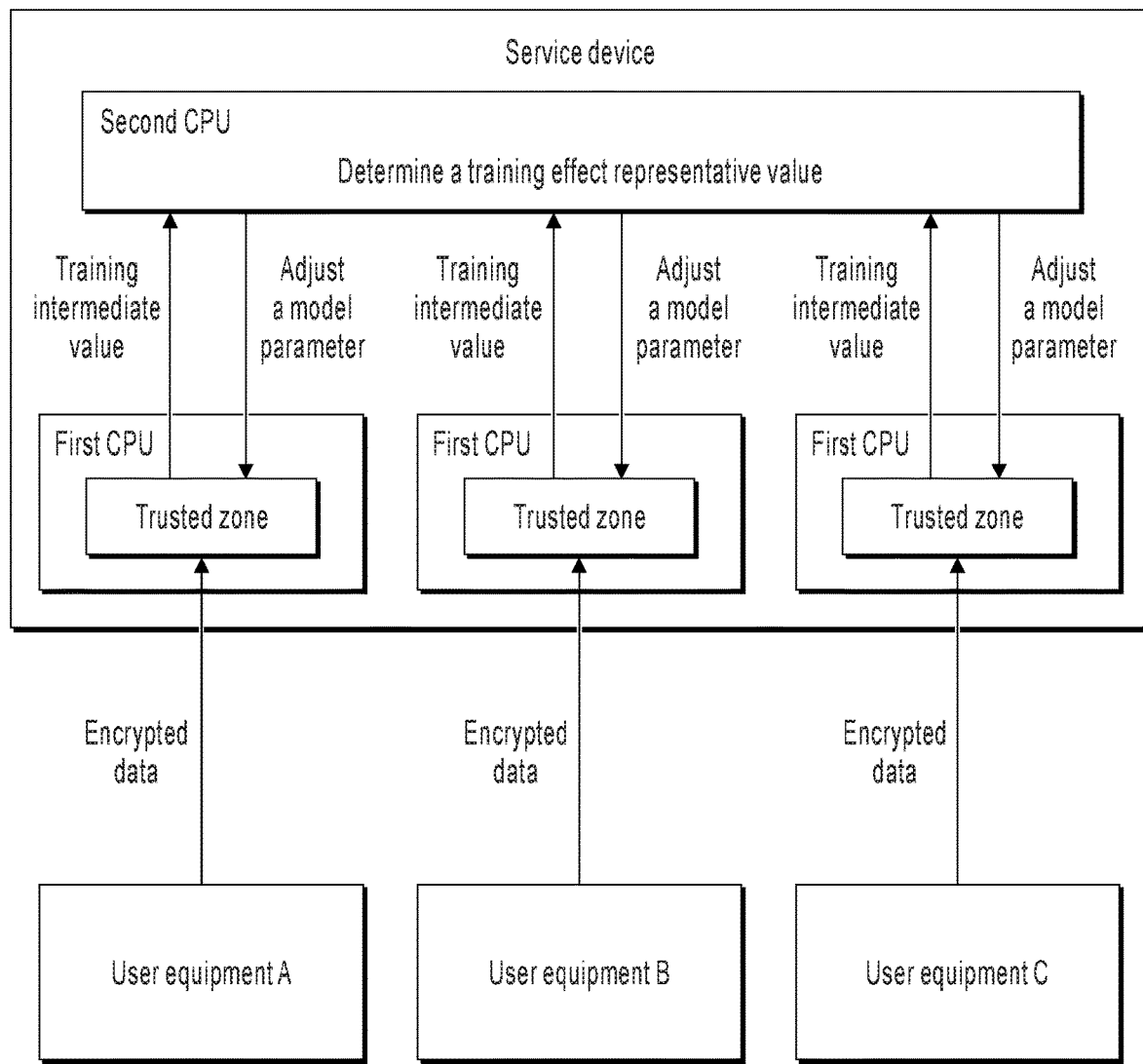
FIG. 3 is an architectural diagram illustrating another training system, according to an implementation of the present disclosure.

Certainly, the service device can include multiple CPUs. FIG. 3 is an architectural diagram illustrating another training system, according to an implementation of the present disclosure. As shown in FIG. 3, a service device includes multiple first CPUs and at least one second CPU. Each first CPU has a trusted zone. It should be noted that the architecture shown in FIG. 3 also includes a memory and a loader, which are not shown in FIG. 3. In FIG. 3, similar to FIG. 2, user equipment sends encrypted data, a trusted zone definition file, and a dynamic link library file to the service device. A trusted zone in each first CPU is defined by the loader. Each first CPU obtains the encrypted data from the memory and processes the encrypted data in the trusted zone.

Generally, whether an effect of model-based prediction is close enough to the actual condition depends on whether model parameters of the model are accurate. In the architecture shown in FIG. 3, model training performed by the service device is actually performing iterative adjustments on the initialized model parameters based on the data sample until the model parameters are accurate enough. That is, the training process shown in FIG. 3 is an iterative training process.

In the architecture shown in FIG. 3, the service device receives encrypted data sent by multiple user equipments, and stores the encrypted data into the memory. Each first CPU can obtain and decrypt encrypted data from only one user equipment, or can obtain and decrypt encrypted data from more than one user equipment, as long as the encrypted data from different user equipment is decrypted in trusted zones of different first CPUs. This is not limited in the present disclosure.

Referring to FIG. 3, each first CPU decrypts the obtained encrypted data in the trusted zone to obtain user data, and determines a training intermediate value based on the user data and the initialized model parameter. After determining the training intermediate value, each first CPU outputs the training intermediate value to the second CPU, and the second CPU determines a training effect representative value based on the received training intermediate values. The training intermediate value is a result value obtained through training by each first CPU based on the decrypted user data. Different training algorithms correspond to different methods for calculating a training intermediate value. For example, if a linear regression algorithm is used, the training intermediate value can be a weighted sum for different eigenvalues of the user data obtained by the first CPU. For ease of description, the following uses the linear regression algorithm as an example for description.

The training effect representative value is a value used to quantify an effect of each iterative training and a value for comprehensively measuring training effects of the first CPUs. It is determined by the second CPU based on the training intermediate values output by the first CPUs. Specifically, the training effect representative value can be a difference representative value between a predicted result obtained in an iterative training process and an actual result.

Still referring to FIG. 3, the second CPU determines whether a model parameter in this iteration is accurate (whether a current model satisfies the expectation) based on whether the determined training effect representative value satisfies a specified condition. The specified condition can be set based on a requirement, for example, the specified condition can be that the training effect representative value is less than a specified threshold.

If the training effect representative value satisfies the specified condition, the training procedure ends, and the model is generated based on the model parameter in this iteration. If the training effect representative value does not satisfy the specified condition, the service device can adjust the model parameter based on the training effect representative value, so that the second CPU and each first CPU continue to train the model based on an adjusted model parameter until the trained model satisfies the specified condition.

Specifically, the service device can adjust the model parameter by using the second CPU based on the training effect representative value, and send the adjusted model parameter to each first CPU, so that the second CPU and each first CPU continue to train the model based on the adjusted model parameter. Alternatively, the service device can send the training effect representative value to each first CPU by using the second CPU, so that each first CPU adjusts the model parameter based on the received training effect representative value, and continues to train the model by using the adjusted model parameter (that is, starting the next iteration).

With the method shown in FIG. 1, two specified operations are performed in the trusted zone of the service device: 1. decrypting the encrypted data to obtain the user data; and 2. performing some training operations. Because only the specified operations can be performed in the trusted zone, the user data decrypted in the trusted zone cannot be output outside the trusted zone. That is, the user data is exposed in only the trusted zone, and even the owner of the service device cannot obtain the user data that is within the trusted zone. Therefore, the user privacy will not be leaked. In addition, because the whole model training process is performed in the trusted zone, the model training process (that is, code logic) is not leaked or modified.

In addition, in one or more implementations of the present disclosure, to prevent someone from maliciously manipulating the service device and extracting the user data outside the trusted zone, the user equipment can encrypt the user data by using an encryption algorithm that can be executed only in a trusted zone in a CPU of the user equipment.

The trusted zone of the CPU is actually an area physically isolated from a storage area of the CPU. The trusted zone has a specified physical parameter. The encryption algorithm that can be executed only in the trusted zone of the CPU is an encryption algorithm that needs to use the physical parameter of the trusted zone. Correspondingly, the service device can decrypt the received encrypted data by using a decryption algorithm corresponding to the encryption algorithm in the trusted zone of the CPU of the service device. The decryption algorithm corresponding to the encryption algorithm can be performed in only the trusted zone of the CPU of the service device.

Apparently, a physical parameter of the trusted zone that needs to be used in the decryption algorithm should be consistent with the physical parameter of the trusted zone that is used in the encryption algorithm. That is, the physical parameter of the trusted zone in the CPU of the user equipment should be consistent with the physical parameter of the trusted zone in the CPU of the serving device. Generally, CPUs produced by the same CPU manufacturer can satisfy this requirement. The technology of applying the physical parameter of the trusted zone to the encryption algorithm and the decryption algorithm is mature, so details are not described here.

The following describes the training architecture shown in FIG. 3 by using two disclosure scenarios as examples.

Figure 4:
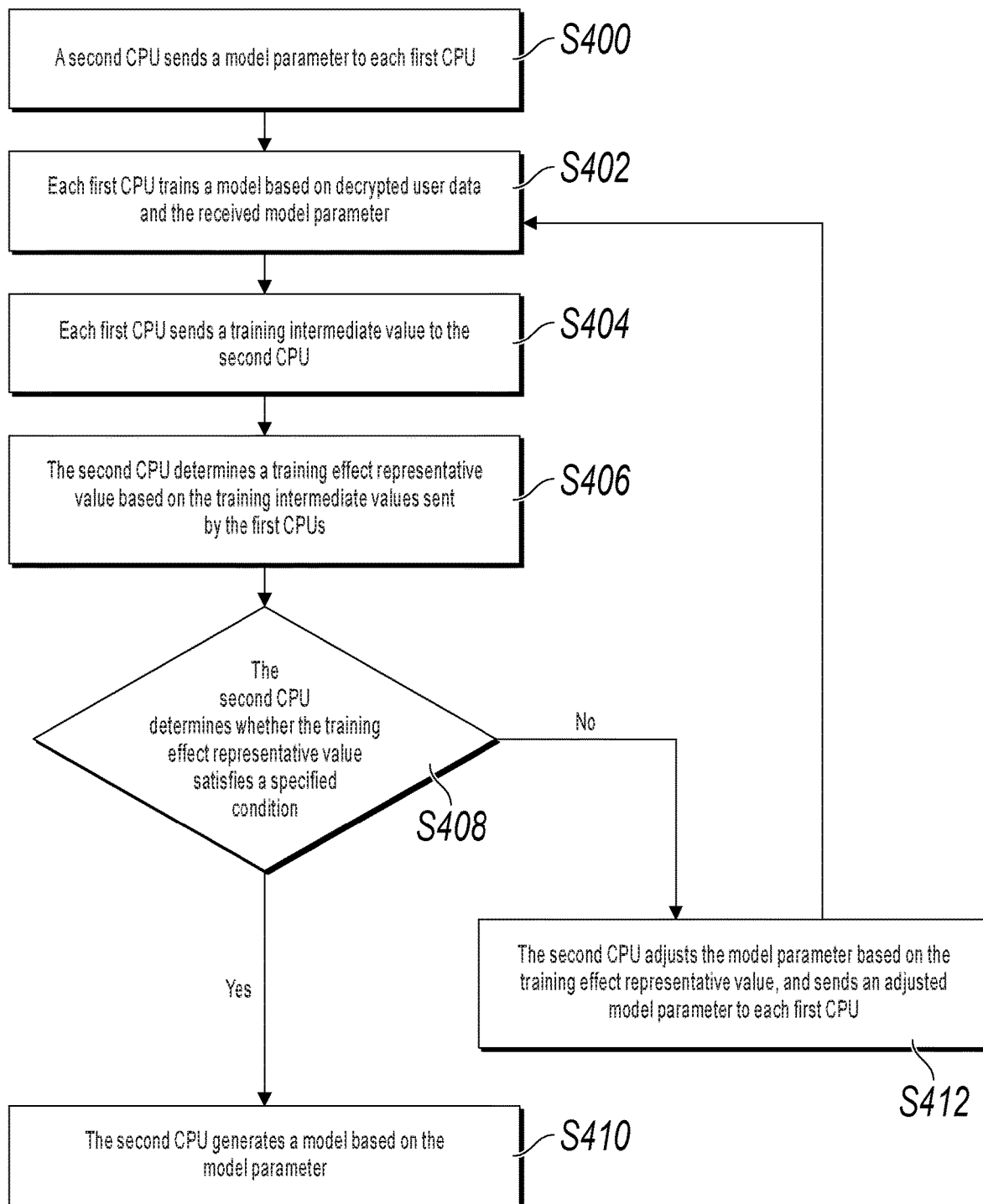
FIG. 4 is a flowchart of training a model for predicting profits or losses of an enterprise, according to an implementation of the present disclosure.

FIG. 4 is a flowchart of training a model for predicting profits or losses of an enterprise, according to an implementation of the present disclosure. The following steps are included:

S400. A second CPU sends a model parameter to each first CPU.

Figure 5:
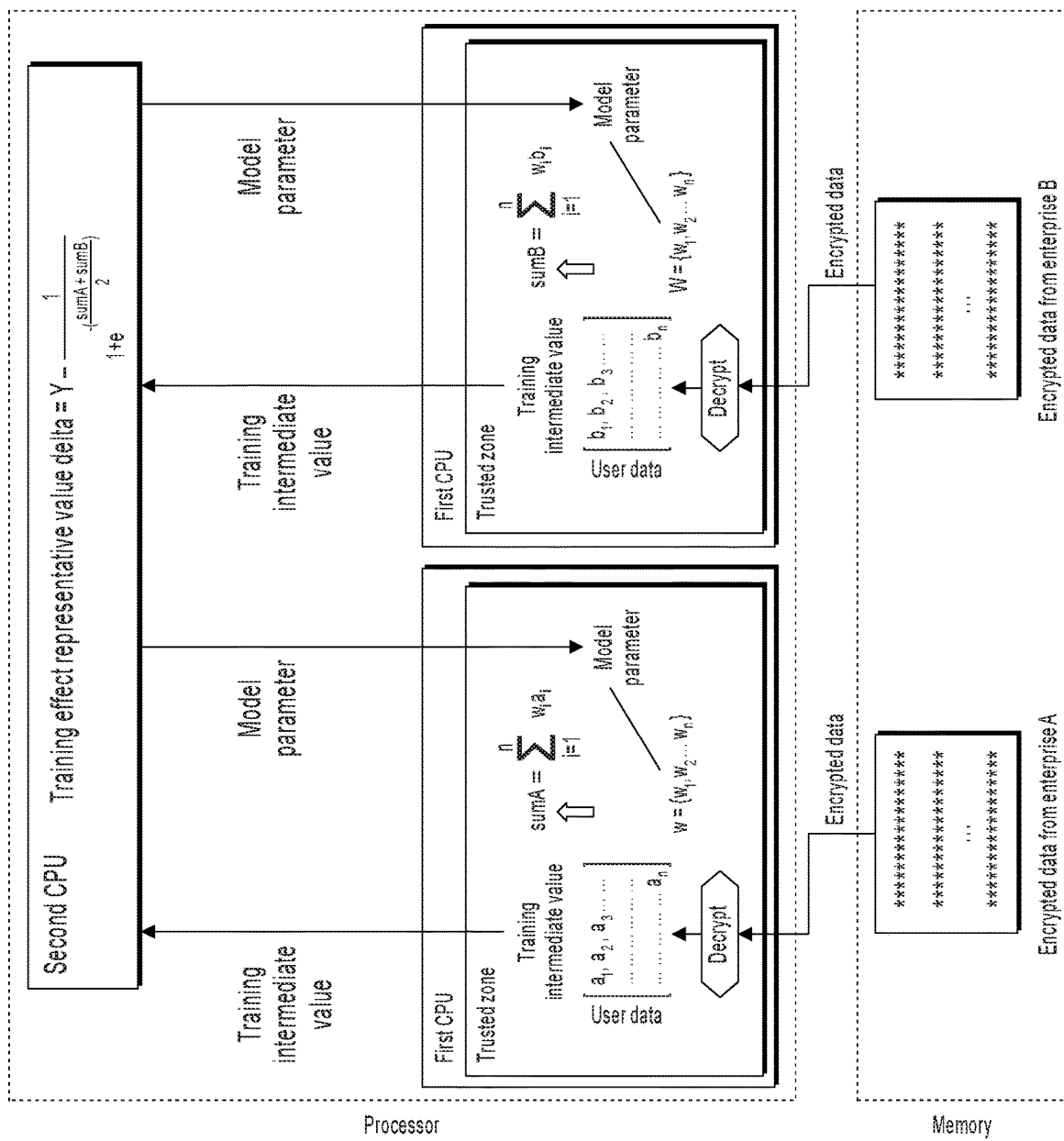
FIG. 5 is a schematic diagram illustrating model training corresponding to FIG. 4, according to an implementation of the present disclosure.

FIG. 5 is a schematic diagram illustrating model training corresponding to FIG. 4, according to an implementation of the present disclosure. As shown in FIG. 4, the second CPU sends an initialized model parameter to each first CPU. All the first CPUs receive the same model parameter, that is, n weight values: W={w1, w2, . . . , wn} in the figure.

S402. Each first CPU trains a model based on decrypted user data and the received model parameter.

In a scenario of training a model for predicting profits or losses of an enterprise, the user data can be a financial statement of the enterprise. In FIG. 5, the first CPU on the left is used as an example. The first CPU obtains encrypted data (that is, an encrypted financial statement) of enterprise A, and decrypts the encrypted data to obtain n pieces of user data which are user data a1 to an. Subsequently, the first CPU uses the initialized model parameter, that is, n weight values, and successively uses the n weight values as weight values corresponding to the n pieces of user data, so as to obtain the weighted sum of the user data through calculation and use the weighted sum as a training intermediate value.

Similarly, the first CPU on the right calculates a corresponding training intermediate value.

S404. Each first CPU sends a training intermediate value to the second CPU.

S406. The second CPU determines a training effect representative value based on the training intermediate values sent by the first CPUs.

As shown in FIG. 5, the second CPU combines the training intermediate values sent by the first CPUs, and calculates, by using an equation $$\text{delta} = Y - \frac{1}{1 + e^{-\left(\frac{sumA + sumB}{2}\right)}},$$

the training effect representative value representing a difference between the iterative training result and an actual result. delta represents the training effect representative value, Y represents the actual result, sumA represents a training intermediate value calculated by using user data of enterprise A, and sumB represents a training intermediate value calculated by using user data of enterprise B. Certainly, alternatively, a training effect representative value can be calculated by using another equation, for example, $$\text{delta} = Y - \left(\frac{1}{1 + e^{-(sumA)}} + \frac{1}{1 + e^{-(sumB)}}\right) / 2 \text{ or}$$

$$\text{delta} = Y - \sqrt{\frac{1}{1 + e^{-(sumA)}} \times \frac{1}{1 + e^{-(sumB)}}}.$$

S408. The second CPU determines whether the training effect representative value satisfies a specified condition; and if yes, performs step S410; or if no, performs step S412.

S410. The second CPU generates a model based on the model parameter.

When the second CPU determines that the training effect representative value satisfies the specified condition, the service device can use a model parameter used by a first CPU as a final model parameter because all the first CPUs use the same model parameter.

S412. The second CPU adjusts the model parameter based on the training effect representative value, and sends an adjusted model parameter to each first CPU. Then, go back to step S402.

Still referring to FIG. 5, if the second CPU determines that the training effect representative value does not satisfy the specified condition, the second CPU adjusts the model parameter based on the training effect representative value, that is, adjusts the n weight values based on a predetermined rule; and sends the adjusted model parameter to each first CPU, so that each first CPU continues to train a model by using the adjusted model parameter until the second CPU determines that the training effect representative value satisfies the specified condition.

In FIG. 5, decrypting the encrypted data and determining the training intermediate value based on the model parameter and the user data are both performed in the trusted zone of the first CPU.

Figure 6:
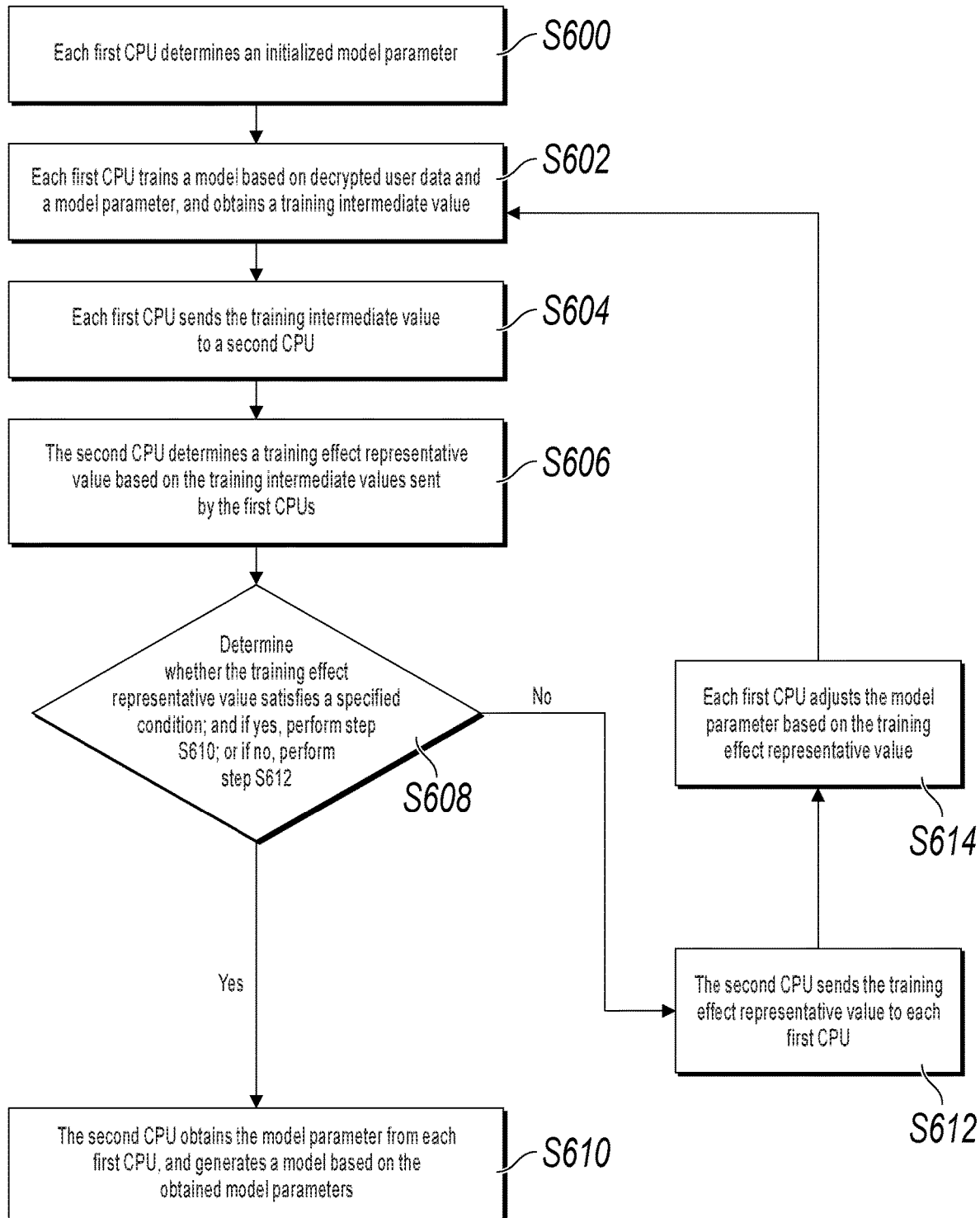
FIG. 6 is a flowchart of training a model for evaluating a personal credit ability, according to an implementation of the present disclosure.

FIG. 6 is a flowchart of training a model for evaluating a personal credit ability, according to an implementation of the present disclosure. The following steps are included:

S600. Each first CPU determines an initialized model parameter.

S602. Each first CPU trains a model based on decrypted user data and a model parameter, and obtains a training intermediate value.

S604. Each first CPU sends the training intermediate value to a second CPU.

In this implementation of the present disclosure, the initialized model parameter used by each first CPU can be set by each first CPU, or can be sent by the second CPU.

Figure 7:
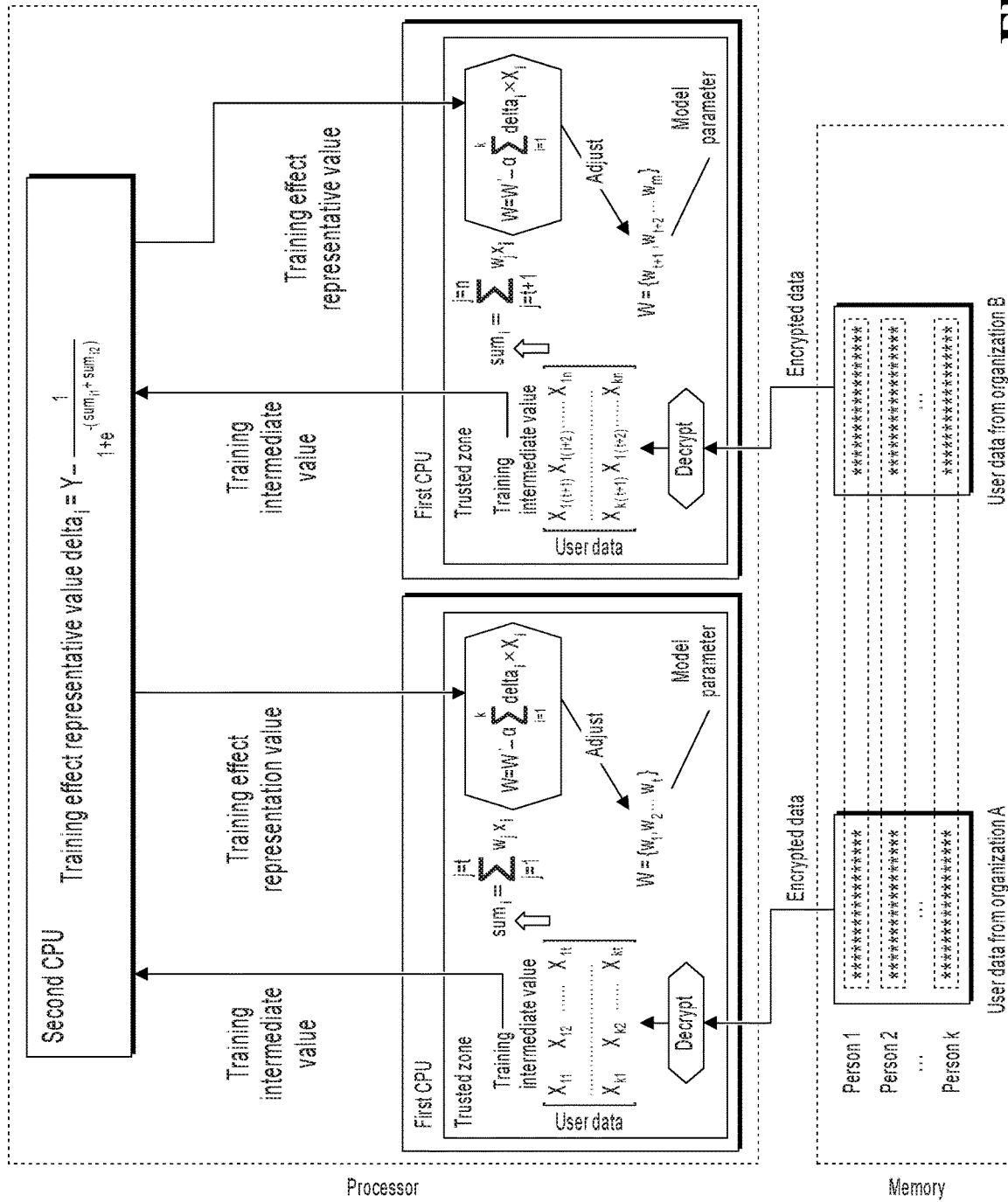
FIG. 7 is a schematic diagram illustrating model training corresponding to FIG. 6, according to an implementation of the present disclosure.

FIG. 7 is a schematic diagram illustrating model training corresponding to FIG. 6 according to an implementation of the present disclosure. As shown in FIG. 7, different first CPUs use different model parameters to train models. The first CPU on the left uses a model parameter W={w1, w2, . . . , wt}, and the first CPU on the right uses a model parameter W={w(t+1), w(t+2), . . . , wm}.

The reason that first CPUs use different model parameters to train model is that, in a scenario of training a model for evaluating a personal credit ability, user data stored in an organization can be a credit record generated in the organization by a person. Credit records of this person usually are generated in multiple organizations. For example, organization A is a bank, and organization B is a 4S store. A loan record is generated when the person gets a loan from organization A, and a vehicle-purchasing record is generated when the person purchases a car in organization B. That is, only a collection of credit records generated in multiple organizations by the person can comprehensively reflect a credit capability of the person. Therefore, credit records generated in different organizations by the person correspond to different model parameters (the credit records correspond to different weight values), that is, user data stored in different organizations corresponds to different model parameters.

As shown in FIG. 7, the first CPU on the left obtains user data in organization A, and the user data in organization A includes credit records generated in organization A by persons 1 to k (each row of the user data is a credit record of a person); and the first CPU on the right obtains user data in organization B, and the user data in organization B includes credit records generated in organization B by persons 1 to k.

Each first CPU decrypts obtained encrypted data to obtain the user data, calculates a training intermediate value based on the user data and the model parameter (that is, calculates the weighted sum of the user data in each row), and sends the training intermediate value to the second CPU.

S606. The second CPU determines a training effect representative value based on the training intermediate values sent by the first CPUs.

The second CPU calculates the training effect representative value based on an equation $$delta_i = Y - \frac{1}{1 + e^{-(sum_{i1} + sum_{i2})}}$$

$delta_i$ represents a training effect representative value corresponding to a user i, $sum_{i1}$ represents a training intermediate value corresponding to the user i and calculated by using user data in organization A, and $sum_{i2}$ represents a training intermediate value corresponding to the user i and calculated by using user data in organization B.

S608. The second CPU determines whether the training effect representative value satisfies a specified condition; and if yes, performs step S610; or if no, performs step S612.

S610. The second CPU obtains the model parameter from each first CPU, and generates a model based on the obtained model parameters.

If the second CPU determines that the training effect representative value satisfies the specified condition, the second CPU obtains the model parameter used by each first CPU in this iteration, and combines the obtained model parameters into a model parameter for generating the model.

S612. The second CPU sends the training effect representative value to each first CPU.

S614. Each first CPU adjusts the model parameter based on the training effect representative value, and goes back to step S602.

If the second CPU determines that the training effect representative value does not satisfy the specified condition, the second CPU sends the training effect representative value to each first CPU, and each first CPU adjusts the model parameter based on an equation $$W = W' - \alpha \sum_{i=1}^{k} delta_i \times x_i$$

and continues to calculate a training intermediate value based on an adjusted model parameter. For each first CPU, W' represents the model parameter used by the first CPU in the previous iteration, $\alpha$ is an algorithm parameter and can be specified according to the need, $delta_i$ represents a training effect representative value corresponding to the person i, and $x_i$ represents user data corresponding to the person i.

In FIG. 7, decrypting the encrypted data, determining the training intermediate value based on the model parameter and the user data, and adjusting the model parameter are all performed in the trusted zone of the first CPU. Because the user data needs to be used in the model parameter adjustment equation, a model parameter adjustment operation is performed in the trusted zone, so as to prevent the user data from being leaked.

Finally, it should be noted that no specific limitation is imposed on the training algorithm (such as linear regression, logistic regression, and a neural network) used in model training, and equations for calculating a training intermediate value, calculating a training effect representative value, and adjusting a model parameter in the training algorithm in the present disclosure. A person skilled in the art can use the architecture shown in FIG. 2, and use other training algorithms and calculation equations to perform iterative model training, which shall all fall within the protection scope of the present disclosure.

Figure 8:
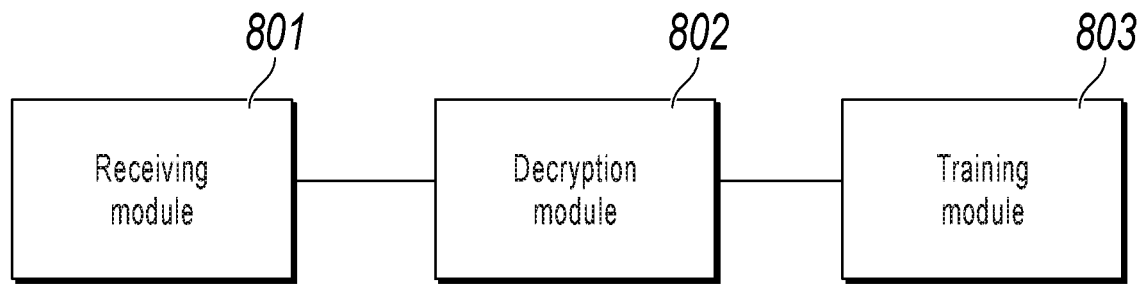
FIG. 8 is a schematic diagram illustrating a model training apparatus, according to an implementation of the present disclosure.

Based on the model training method shown in FIG. 1, an implementation of the present disclosure further provides a corresponding model training apparatus. As shown in FIG. 8, the apparatus has a trusted zone, and the apparatus includes: a receiving module 801, configured to receive encrypted data sent by user equipment; a decryption module 802, configured to decrypt the encrypted data in the trusted zone to obtain user data; and a training module 803, configured to train a model by using the user data in the trusted zone.

The decryption module 802 decrypts the encrypted data in the trusted zone by using a decryption algorithm that can be executed only in the trusted zone, to obtain the user data.

The trusted zone is located in a CPU of the apparatus.

The apparatus includes multiple first CPUs and at least one second CPU.

The receiving module 801 receives encrypted data sent by multiple user equipments.

The decryption module 802 decrypts the encrypted data in trusted zones of first CPUs to obtain the user data. The encrypted data from different user equipments is decrypted in trusted zones of different first CPUs.

The training module 803 trains a model in a trusted zone of each first CPU based on user data obtained through decryption in the first CPU and a model parameter sent by the second CPU, obtains a training intermediate value, and outputs the training intermediate value to the second CPU by using the first CPU; determines a training effect representative value by using the second CPU based on the training intermediate values output by the first CPUs; and adjusts the model parameter based on the training effect representative value, so that the second CPU and each first CPU continue to train a model based on an adjusted model parameter until a trained model satisfies a specified condition.

The training module 803 adjusts the model parameter by using the second CPU based on the training effect representative value, and sends the adjusted model parameter to each first CPU, so that the second CPU and each first CPU continue to train a model based on the adjusted model parameter.

The training module 803 sends the training effect representative value to each first CPU by using the second CPU, so that each first CPU adjusts the model parameter based on the training effect representative value, and continues to train a model based on the adjusted model parameter.

Figure 9:
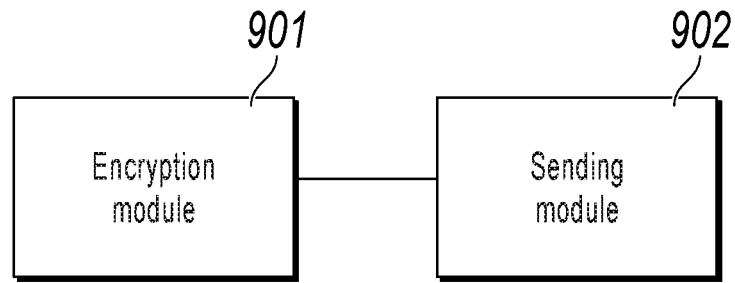
FIG. 9 is a schematic diagram illustrating another model training apparatus, according to an implementation of the present disclosure.

Based on the model training method shown in FIG. 1, an implementation of the present disclosure further provides another model training apparatus. As shown in FIG. 9, a service device has a trusted zone, and the apparatus includes: an encryption module 901, configured to encrypt user data to obtain encrypted data; and a sending module 902, configured to send the encrypted data to the service device, so that the service device decrypts the encrypted data in the trusted zone to obtain the user data, and trains a model by using the user data.

The apparatus has a trusted zone.

The encryption module 901 encrypts the user data by using an encryption algorithm that can be executed only in the trusted zone of the apparatus, so that the service device decrypts the received encrypted data by using a decryption algorithm corresponding to the encryption algorithm. The decryption algorithm corresponding to the encryption algorithm can be executed only in the trusted zone of the service device.

Figure 10:
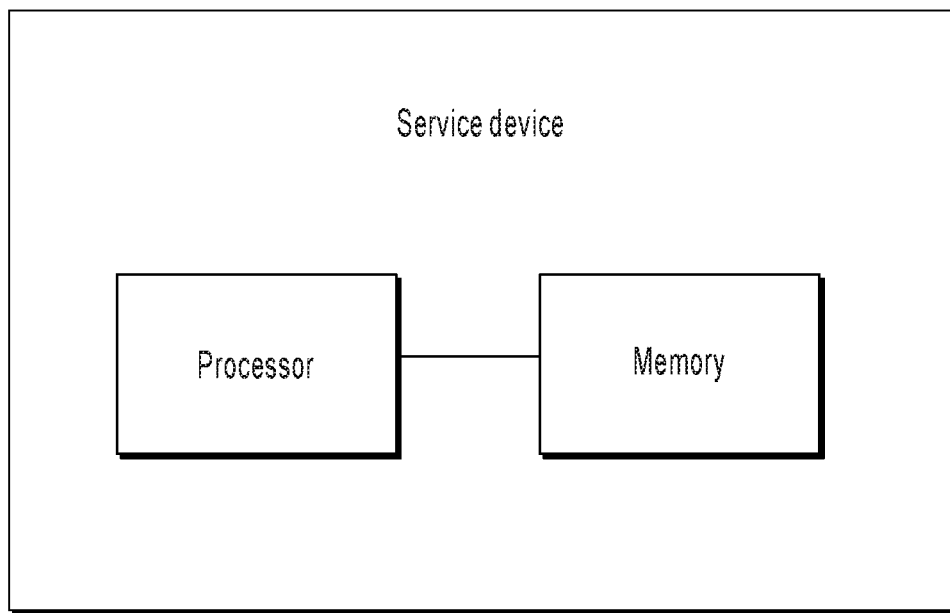
FIG. 10 is a schematic diagram illustrating user equipment, according to an implementation of the present disclosure.

Based on the model training method shown in FIG. 1, an implementation of the present disclosure provides a service device, as shown in FIG. 10. The service device has a trusted zone. The service device includes one or more processors and a memory, the memory stores a program, and the program is executed by the one or more processors to perform the following steps: receiving encrypted data sent by user equipment; decrypting the encrypted data in the trusted zone to obtain user data; and training a model by using the user data in the trusted zone.

Figure 11:
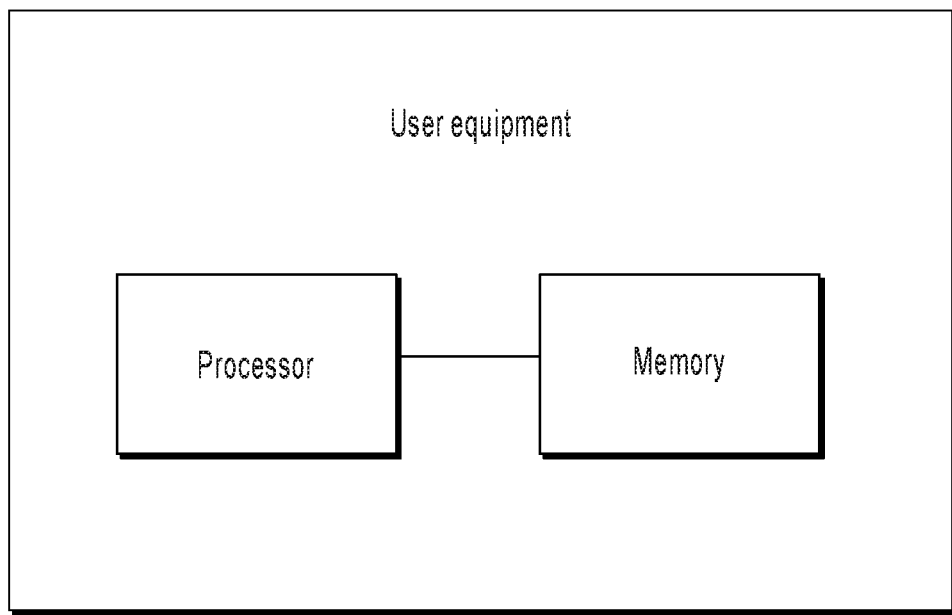
FIG. 11 is a schematic diagram illustrating a service device, according to an implementation of the present disclosure.

Based on the model training method shown in FIG. 1, an implementation of the present disclosure provides user equipment, as shown in FIG. 11. A service device has a trusted zone. The user equipment includes one or more processors and a memory, the memory stores a program, and the program is executed by the one or more processors to perform the following steps: encrypting user data to obtain encrypted data; and sending the encrypted data to the service device, so that the service device decrypts the encrypted data in the trusted zone to obtain the user data, and trains a model by using the user data.

The implementations in the present disclosure are all described in a progressive manner. Mutual reference can be made to these implementations for same or similar parts in the implementations. Each implementation focuses on a difference from other implementations. In particular, the service device shown in FIG. 10 and the user equipment shown in FIG. 11 are similar to the method implementation, and therefore are described briefly. For related parts, refer to related descriptions in the method implementation.

In the 1990s, improvement of a technology can be clearly distinguished between hardware improvement (for example, improvement of circuit structures such as a diode, a transistor, and a switch) and software improvement (improvement of a method procedure). However, with the development of technologies, improvement of many method procedures can be considered as a direct improvement of a hardware circuit structure. Designers almost all program an improved method procedure to a hardware circuit, to obtain a corresponding hardware circuit structure. Therefore, it cannot be said that an improvement of a method procedure cannot be implemented by using a hardware entity module. For example, a programmable logic device (PLD) (for example, a field programmable gate array (FPGA)) is a type of an integrated circuit. A logical function of the PLD is determined by component programming executed by a user. The designers perform programming to "integrate" a digital system into a single PLD without requiring a chip manufacturer to design and produce a dedicated integrated circuit chip. In addition, instead of manually producing an integrated circuit chip, the programming is mostly implemented by "logic compiler" software, which is similar to a software compiler used during program development. Original code before compiling is also written in a specified programming language, which is referred to as hardware description language (HDL). There may be multiple HDLs, such as an Advanced Boolean Expression Language (ABEL), an Altera Hardware Description Language (AHDL), Confluence, a Cornell University Programming Language (CUPL), an HDCal, a Java Hardware Description Language (JHDL), a Lava, a Lola, a MyHDL, a PALASM, and a Ruby Hardware Description Language (RHDL). Currently, the very-high-speed Integrated Circuit Hardware Description Language (VHDL) and Verilog are most commonly used. A person skilled in the art should also understand that a method procedure only needs to be logically programmed, and programmed to the integrated circuit by using the previous hardware description languages, so that a hardware circuit that implements the logical method procedure can be easily obtained.

The controller can be implemented in any suitable manner. For example, the controller can be a microprocessor, a processor, a computer readable medium storing computer-readable program code (for example, software or firmware) that can be executed by a processor (microprocessor), a logic gate, a switch, an application-specific integrated circuit (ASIC), a programmable logic controller, or an embedded microcontroller. Examples of the controller include but are not limited to the following microcontrollers: ARC 625D, Atmel AT91SAM, Microchip PIC18F26K20, and Silicone Labs C8051F320. The memory controller can also be implemented as a part of the control logic of the memory. A person skilled in the art also knows that a controller can be implemented in a manner of computer-readable program code only, and the steps in the method can be logically programmed to enable the controller to further implement same functions in forms of a logical gate, a switch, an application-specific integrated circuit, a programmable logic controller, an embedded microcontroller, etc. Therefore, the controller can be considered as a hardware component, and an apparatus included in the controller and configured to implement various functions can also be considered as a structure in the hardware component. Alternatively, an apparatus configured to implement various functions can be considered as both a software module for implementing the method and a structure in a hardware component.

The system, the apparatus, the module, or the unit described in the previous implementations can be implemented by a computer chip or an entity, or implemented by a product with a specific function. A typical implementation device is a computer. The computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the previous apparatus is described by dividing the functions into various units. Certainly, when the present disclosure is implemented, the functions of each unit can be implemented in one or more pieces of software and/or hardware.

A person skilled in the art should understand that the implementations of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product based on the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general purpose computer, a dedicated computer, an embedded processor, or a processor of any other programmable data processing device to generate a machine, so that the instructions executed by a computer or a processor of any other programmable data processing device generate an apparatus for implementing a specific function in one or more procedures in the flowcharts and/or in one or more blocks in the block diagrams.

These computer program instructions can be stored in a computer-readable memory that can instruct the computer or any other programmable data processing devices to work in a specific manner, so that the instructions stored in the computer-readable memory can generate an artifact that includes an instruction apparatus. The instruction apparatus implements a specific function in one or more procedures in the flowcharts and/or in one or more blocks in the block diagrams.

These computer program instructions can be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

In a typical configuration, a computing device includes one or more CPUs, an input/output interface, a network interface, and a memory.

The memory can include a non-persistent memory, a random access memory (RAM), a non-volatile memory, and/or another form that are in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data. Examples of the computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, a tape and disk storage or another magnetic storage device, or any other non-transmission media that can be configured to store information that a computing device can access. As described in the present disclosure, the computer-readable medium does not include transitory computer-readable media (transitory media), such as a modulated data signal and a carrier.

It should be further noted that, the terms "include", "comprise", or any variants thereof are intended to cover a non-exclusive inclusion, so that a process, a method, a commodity, or a device that includes a list of elements not only includes those elements but also includes other elements which are not expressly listed, or further includes elements inherent to such process, method, commodity, or device. Without more constraints, an element described by the sentence "includes a . . . " further includes another identical element in the process, method, commodity, or device that includes the element.

A person skilled in the art should understand that the implementations of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product that is implemented on one or more computer-usable storage media (including but not limited to a disk memory, a CD-ROM, an optical memory, etc.) that include computer-usable program code.

The present disclosure can be described in the general context of computer executable instructions executed by a computer, for example, a program module. Generally, the program module includes a routine, a program, an object, a component, a data structure, etc. for executing a particular task or implementing a particular abstract data type. The present disclosure can also be practiced in distributed computing environments in which tasks are performed by remote processing devices that are connected by using a communications network. In the distributed computing environments, program modules can be located in both local and remote computer storage media including storage devices.

The previous implementations are merely implementations of the present disclosure, and are not intended to limit the present disclosure. A person skilled in the art can make various modifications and variations to the present disclosure. Any modification, equivalent replacement, or improvement made without departing from the spirit and the principle of the present disclosure shall fall within the scope of the claims of the present disclosure.

Figure 12:
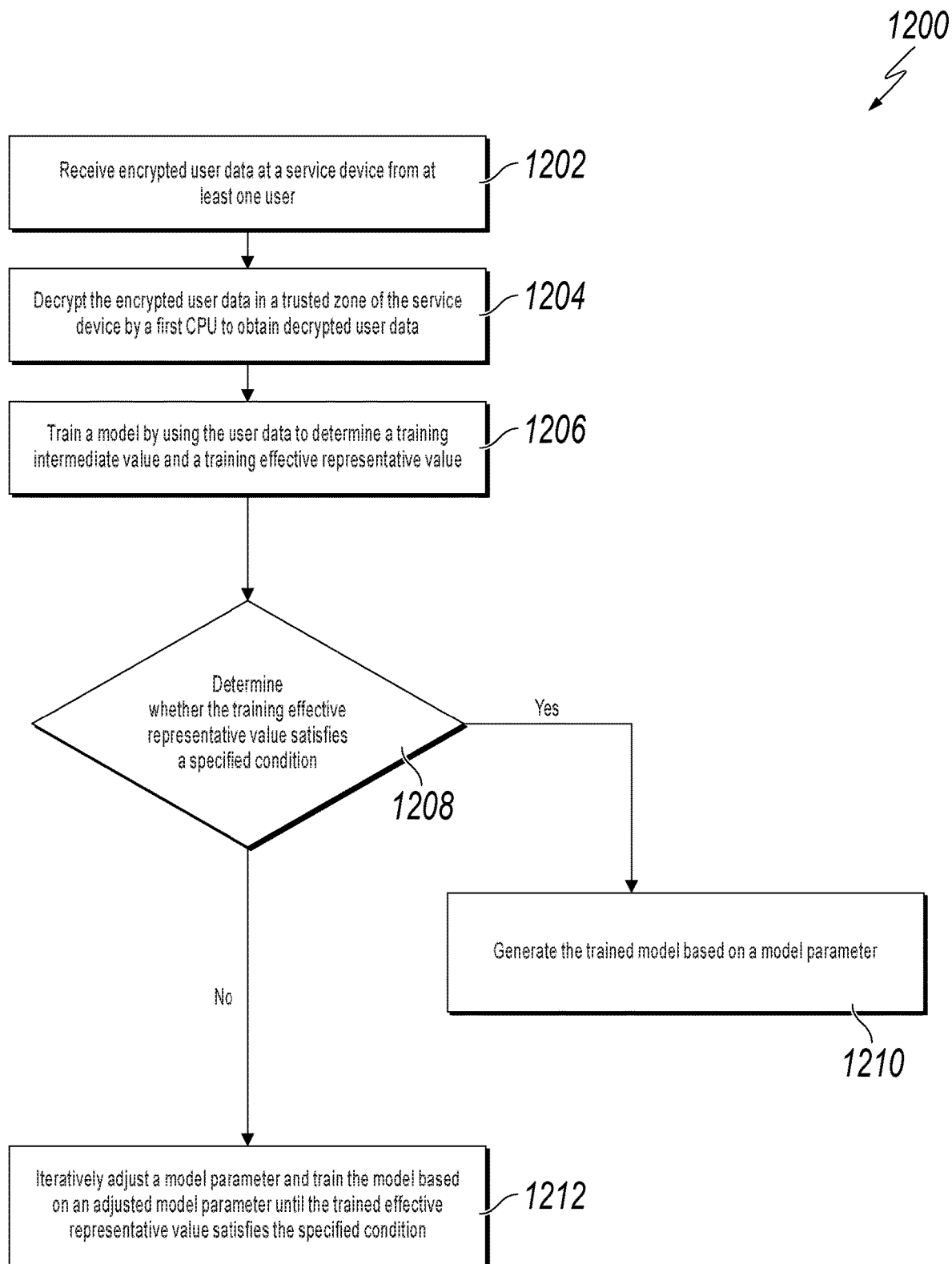
FIG. 12 is a flowchart illustrating an example of a computer-implemented method for enhancing data security through model training, according to an implementation of the present disclosure.

FIG. 12 is a flowchart illustrating an example of a computer-implemented method 1200 for enhancing data security through model training, according to an implementation of the present disclosure. For clarity of presentation, the description that follows generally describes method 1200 in the context of other figures and associated description in this disclosure. However, it will be understood that method 1200 can be performed, for example, by any system, environment, software, and hardware, or a combination of systems, environments, software, and hardware, as appropriate. In some implementations, various steps of method 1200 can be run in parallel, in combination, in loops, or in any order.

At 1202, encrypted user data from at least one user equipment is received at a service device. The user data is encrypted in a trusted zone of the at least one user equipment. In some implementations, user data is encrypted to generate the encrypted user data by using an encryption algorithm that can only be executed in the trusted zone of the at least one user equipment. The encrypted user data is decrypted by using a decryption algorithm that can only be executed in the trusted zone of the service device, and the decryption algorithm corresponds to the encryption algorithm. In some implementations, the decryption of the encrypted user data is performed by a first CPU to obtain user data, where the trusted zone is located at the first CPU, and where the service device comprises at least one first CPU and at least one second CPU.

In some implementations, the service device includes a loader that defines the trusted zone.

In some implementations, the encrypted user data can be received from multiple user equipment, and the encrypted user data received from different user equipment is decrypted in trusted zones of different at least one first CPUs. From 1202, method 1200 proceeds to 1204.

At 1204, in a trusted zone of the service device, the encrypted user data is decrypted by a first CPU to obtain decrypted user data. From 1204, method 1200 proceeds to 1206.

At 1206, at the service device, a model is trained by using the decrypted user data to determine a training intermediate value and a training effective representative value. The training effective representative value is determined based on the training intermediate value.

In some implementations, the method of training a model at the service device includes: receiving, at the at least one first CPU, a model parameter from the at least one second CPU; training, by each first CPU of the at least one CPU, a model to determine a training intermediate value based on the user data and the received model parameter; sending the determined training intermediate value to the at least one second CPU; and determining a training effect representative value based on the received training intermediate value.

In some implementations, when there are multiple first CPUs, the model parameter received at each of the multiple first CPUs can be the same or can be different. From 1206, method 1200 proceeds to 1208.

At 1208, a determination is made as to whether the training effective representative value satisfies a specified condition. If it is determined that the training effective representative value satisfies the specified condition method 1200 proceeds to 1210. Otherwise, if it is determined that the training effective representative value does not satisfy the specified condition, method 1200 proceeds to 1212.

At 1210, a trained model is generated based on a model parameter. After 1210, method 1200 can stop.

At 1212, the model parameter is iteratively adjusted and the model is iteratively trained based on the adjusted model parameter until the trained effective representative value satisfies the specified condition. In some implementations, in response to a determination that the training effective representative value does not satisfy the specified condition, iteratively adjusting a model parameter and training the model based on an adjusted model parameter includes performing one or more steps that are, adjusting the model parameter by the at least one second CPU based on the training effective representative value, and sending the adjust model parameter to each at least one first CPU to train the model; or sending the training effective representative value to each at least one first CPU by using the at least one second CPU, and adjusting the model parameter by each at least one first CPU based on the received training effective representative value to train the model. After 1212, method 1200 can stop.

Implementations of the present application describe methods and apparatuses for data security enhancement through model training. In existing technology, a service provider usually directly uses data provided by a user as a sample to train a model. The user usually does not provide the service provider with data related to user privacy. Therefore, data samples for model training are insufficient, and a trained model obtained by the service provider is inaccurate. Therefore, a method to improve accuracy of a model of a service provider while protecting leaks of a user's private data is a problem that needs to be solved. Described implementations use an isolated trusted zone in a service device as an execution environment, decrypt encrypted data in the trusted zone to obtain user data, and train a model by using the user data in the trusted zone, so that the user data is not leaked from the trusted zone during a model training process.

The method is easy to implement and can improve computational efficiency. To ensure that the user data is not leaked, training operations performed in the trusted zone need to be performed based on the user data, and other training operations that do not need to be performed based on the user data can be performed outside the trusted zone. Operations other than specified operations, for example, extracting the user data from the trusted zone, cannot be performed in the trusted zone. For example, two specified operations are performed in the trusted zone of the service device, decrypting the encrypted data to obtain the user data; and performing training operations. Because only the specified operations can be performed in the trusted zone, the user data decrypted in the trusted zone cannot be output outside the trusted zone. That is, the user data is exposed in only the trusted zone, and even the owner of the service device cannot obtain the user data that is within the trusted zone. Therefore, private user data will not be leaked. In addition, because the model training process (that is, code logic) is performed in the trusted zone, the model training process will not be leaked or modified.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   receiving, at a service device, a plurality sets of encrypted user data from a plurality of user devices, wherein each set of encrypted user data is generated from each set of user data that is encrypted in a trusted zone of each user device;
   decrypting, in a plurality of trusted zones of the service device, the plurality sets of encrypted user data by a plurality of first central processing units (CPUs) to obtain a plurality sets of decrypted user data, wherein each trusted zone is located at each first CPU, and wherein the service device comprises the plurality of first CPU and a second CPU;
   training, at the service device, a model by using the plurality sets of decrypted user data to determine a plurality of training intermediate values and a training effective representative value, wherein different first CPUs use different sets of first model parameters to train different first models, wherein each training intermediate value is determined based on each set of decrypted user data and each set of first model parameters that are trained on each first CPU, wherein the training effective representative value is determined based on the training intermediate values;

determining, whether the training effective representative value satisfies a specified condition;

in response to determining that the training effective representative value satisfies the specified condition, generating, by the second CPU, the trained model based on each set of first model parameters used by each first CPU; and in response to determining that the training effective representative value does not satisfy the specified condition, iteratively adjusting each set of first model parameters used by each first CPU and training the model based on each set of adjusted first model parameters until the training effective representative value satisfies the specified condition, comprising:
sending, from the second CPU, the training effective representative value to each first CPU; and
calculating, in the trusted zone of each first CPU, updated first model parameters based on the received training effective representative value and the decrypted user data.

2. The computer-implemented method of claim 1, wherein user data is encrypted to generate the encrypted user data by using an encryption algorithm that can only be executed in the trusted zone of each user device, wherein the encrypted user data is decrypted by using an decryption algorithm that can only be executed in the plurality of trusted zones of the service device, and wherein the decryption algorithm corresponds to the encryption algorithm.

3. The computer-implemented method of claim 1, wherein the service device comprises a loader that defines the trusted zone.

4. The computer-implemented method of claim 1, wherein the plurality sets of encrypted user data received from different user devices is decrypted in trusted zones of different first CPUs.

5. The computer-implemented method of claim 1, wherein training the model at the service device comprises:
receiving, at each first CPU, first model parameters from the second CPU;
training, by each first CPU of the plurality of first CPUs, each first model to determine the training intermediate value based on the decrypted user data and the received first model parameters;
sending the determined training intermediate value to the second CPU; and
determining, by the second CPU, the training effect representative value based on the received training intermediate value.

6. A non-transitory, computer-readable medium storing one or more instructions executable by a computer system to perform operations comprising:
receiving, at a service device, a plurality sets of encrypted user data from a plurality of user devices, wherein each set of encrypted user data is generated from each set of user data that is encrypted in a trusted zone of each user device;
decrypting, in a plurality of trusted zones of the service device, the plurality sets of encrypted user data by a plurality of first central processing units (CPUs) to obtain a plurality sets of decrypted user data, wherein each trusted zone is located at each first CPU, and wherein the service device comprises the plurality of first CPU and a second CPU;
training, at the service device, a model by using the plurality sets of decrypted user data to determine a plurality of training intermediate values and a training effective representative value, wherein different first CPUs use different sets of first model parameters to train different first models, wherein each training intermediate value is determined based on each set of decrypted user data and each set of first model parameters that are trained on each first CPU, wherein the training effective representative value is determined based on the training intermediate values;

determining, whether the training effective representative value satisfies a specified condition;

in response to determining that the training effective representative value satisfies the specified condition, generating, by the second CPU, the trained model based on each set of first model parameters used by each first CPU; and in response to determining that the training effective representative value does not satisfy the specified condition, iteratively adjusting each set of first model parameters used by each first CPU and training the model based on each set of adjusted first model parameters until the training effective representative value satisfies the specified condition, comprising:
sending, from the second CPU, the training effective representative value to each first CPU; and
calculating, in the trusted zone of each first CPU, updated first model parameters based on the received training effective representative value and the decrypted user data.

7. The non-transitory, computer-readable medium of claim 6, wherein user data is encrypted to generate the encrypted user data by using an encryption algorithm that can only be executed in the trusted zone of each user device, wherein the encrypted user data is decrypted by using an decryption algorithm that can only be executed in the plurality of trusted zones of the service device, and wherein the decryption algorithm corresponds to the encryption algorithm.

8. The non-transitory, computer-readable medium of claim 6, wherein the service device comprises a loader that defines the trusted zone.

9. The non-transitory, computer-readable medium of claim 6, wherein the plurality sets of encrypted user data received from different user devices is decrypted in trusted zones of different first CPUs.

10. The non-transitory, computer-readable medium of claim 6, wherein training the model at the service device comprises:
receiving, at each first CPU, first model parameters from the second CPU;
training, by each first CPU of the plurality of first CPUs, each first model to determine the training intermediate value based on the decrypted user data and the received first model parameters;
sending the determined training intermediate value to the second CPU; and
determining, by the second CPU, the training effect representative value based on the received training intermediate value.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

receiving, at a service device, a plurality sets of encrypted user data from a plurality of user devices, wherein each set of encrypted user data is generated from each set of user data that is encrypted in a trusted zone of each user device;

decrypting, in a plurality of trusted zones of the service device, the plurality sets of encrypted user data by a plurality of first central processing units (CPUs) to obtain a plurality sets of decrypted user data, wherein each trusted zone is located at each first CPU, and wherein the service device comprises the plurality of first CPU and a second CPU;

training, at the service device, a model by using the plurality sets of decrypted user data to determine a plurality of training intermediate values and a training effective representative value, wherein different first CPUs use different sets of first model parameters to train different first models, wherein each training intermediate value is determined based on each set of decrypted user data and each set of first model parameters that are trained on each first CPU, wherein the training effective representative value is determined based on the training intermediate values;

determining, whether the training effective representative value satisfies a specified condition;

in response to determining that the training effective representative value satisfies the specified condition, generating, by the second CPU, the trained model based on each set of first model parameters used by each first CPU; and in response to determining that the training effective representative value does not satisfy the specified condition, iteratively adjusting each set of first model parameters used by each first CPU and training the model based on each set of adjusted first model parameters until the training effective representative value satisfies the specified condition, comprising:

sending, from the second CPU, the training effective representative value to each first CPU; and calculating, in the trusted zone of each first CPU, updated first model parameters based on the received training effective representative value and the decrypted user data.

12. The computer-implemented system of claim 11, wherein user data is encrypted to generate the encrypted user data by using an encryption algorithm that can only be executed in the trusted zone of each user device, wherein the encrypted user data is decrypted by using an decryption algorithm that can only be executed in the plurality of trusted zones of the service device, and wherein the decryption algorithm corresponds to the encryption algorithm.

13. The computer-implemented system of claim 11, wherein the service device comprises a loader that defines the trusted zone.

14. The computer-implemented system of claim 11, wherein the plurality sets of encrypted user data received from different user devices is decrypted in trusted zones of different first CPUs.

15. The computer-implemented system of claim 11, wherein training the model at the service device comprises:

receiving, at each first CPU, first model parameters from the second CPU;

training, by each first CPU of the plurality of first CPUs, each first model to determine the training intermediate value based on the decrypted user data and the received first model parameters;

sending the determined training intermediate value to the second CPU; and determining, by the second CPU, the training effect representative value based on the received training intermediate value.

* * * * *

UNITED STATES PATENT AND TRADEMARK OFFICE
CERTIFICATE OF CORRECTION

| | | |
|---|---|---|
| PATENT NO. | : 10,929,558 B2 | Page 1 of 1 |
| APPLICATION NO. | : 16/047399 | |
| DATED | : February 23, 2021 | |
| INVENTOR(S) | : Ling Xie and Xiaolong Li | |

It is certified that error appears in the above-identified patent and that said Letters Patent is hereby corrected as shown below:

On the Title Page

Column 1, Item (54) Title, Line 1, delete "SECRUITY" and insert -- SECURITY --, therefor.

Column 2, Item (57) Abstract, Line 12, delete "iterately" and insert -- iteratively --, therefor.

In the Specification

Column 1, Line 1, delete "SECRUITY" and insert -- SECURITY --, therefor.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*